US012398588B2

(12) United States Patent
Chang

(10) Patent No.: US 12,398,588 B2
(45) Date of Patent: Aug. 26, 2025

(54) DOOR STOP AND DOOR FRAME ASSEMBLY

(71) Applicant: SHIEN CHENG ENTERPRISE CO., LTD., Taichung (TW)

(72) Inventor: Keng-Hao Chang, Taichung (TW)

( * ) Notice: Subject to any disclaimer, the term of this patent is extended or adjusted under 35 U.S.C. 154(b) by 0 days.

(21) Appl. No.: 18/465,984

(22) Filed: Sep. 13, 2023

(65) Prior Publication Data

US 2025/0084687 A1 Mar. 13, 2025

(51) Int. Cl.
*E06B 1/52* (2006.01)
*E05F 5/06* (2006.01)
*E06B 1/04* (2006.01)

(52) U.S. Cl.
CPC .................. *E06B 1/52* (2013.01); *E05F 5/06* (2013.01); *E06B 1/045* (2013.01)

(58) Field of Classification Search
CPC .... E05F 5/06; E06B 1/52; E06B 1/526; E06B 1/18; E06B 1/30; E06B 1/045
See application file for complete search history.

(56) References Cited

U.S. PATENT DOCUMENTS 4,034,513 A * 7/1977 Richardson ............... E06B 1/64 49/504
4,376,354 A * 3/1983 Passovoy .............. E05D 5/0238 49/504
4,642,954 A * 2/1987 Sigerist ..................... E06B 1/34 52/211
5,293,723 A * 3/1994 Slessor ..................... E06B 1/30 49/504
5,325,633 A * 7/1994 Magoon .................. E06B 1/045 49/504
6,672,021 B2 * 1/2004 Kusano ..................... E05D 7/02 52/204.5
8,713,866 B2 * 5/2014 Gadoury ................... E06B 1/56 52/211
9,187,945 B2 * 11/2015 Back ........................ E06B 1/045
9,714,536 B2 * 7/2017 Timko .................... E06B 1/526
10,724,289 B2 * 7/2020 Mayo ......................... E06B 1/52
2002/0002804 A1 * 1/2002 Sheehy ..................... E04B 1/12 52/93.2
2005/0193652 A1 * 9/2005 Cornell ................. E06B 1/6015 52/204.1
2011/0047906 A1 * 3/2011 Fitzpatrick ................ E06B 1/08 52/211

(Continued)

*Primary Examiner* — Justin B Rephann
(74) *Attorney, Agent, or Firm* — Bruce Stone LLP; Joseph A. Bruce

(57) ABSTRACT

A door stop and door frame assembly to be mounted on a wall, includes: a door stop strip in an elongated strip shape, and including a body and a connecting portion located on one side of the body and an insertion portion connected to the connecting portion, wherein one end of the body is an assembling end; a door frame mounted on the wall, wherein one side of the door frame facing away from wall includes an accommodation groove and an insertion groove that are connected with each other, the connecting portion is located in the accommodation groove, and the insertion portion is located in the insertion groove; a fixing member inserted into the door frame and the door stop strip to fix the door stop strip to the door frame; and the assembling end is connected to a buffer, and the buffer is pushed against a door panel.

8 Claims, 8 Drawing Sheets

(56) References Cited

U.S. PATENT DOCUMENTS

| | | | | |
|---|---|---|---|---|
| 2013/0219813 | A1* | 8/2013 | Gadoury | E06B 1/12<br>52/211 |
| 2014/0069038 | A1* | 3/2014 | Back | E06B 1/32<br>52/745.15 |
| 2016/0097226 | A1* | 4/2016 | Timko | E06B 1/52<br>49/504 |

* cited by examiner

DOOR STOP AND DOOR FRAME ASSEMBLY

BACKGROUND

Field of the Invention

The present invention relates to a door stop, and more particularly to a door stop and door frame assembly.

Description of Related Art

Generally, the door stop is used to stop the door frame, and the door stop and the door frame can be formed as one or two pieces of structure, when the door stop and door frame are two-piece, the door stop and door frame are in a concave and convex fit, combined in a mutual locking manner, so that although the door stop can cover the nail heads locked on the door frame, the door stop can not fine tune its position. When the door is used for a long time, the stability of the fit between the door stop and the door panel will be greatly reduced, if the position of the door stop can not be adjusted, it will lead to the door panel can not be correctly against the door stop, which may cause problems such as unreliable closing. Therefore, a door stop and door frame assembly that can adjust the position of the door stop is needed.

SUMMARY

The present invention provides a door stop and door frame assembly, the main objective of which is to enable the door stop to be shifted relative to the door frame and fine-tuned so that the door panel is correctly pressed against the door stop.

To achieve the above objective, a door stop and door frame assembly configured to be mounted on a wall, comprises:

a door stop strip in an elongated strip shape, and including a body and a connecting portion located on one side of the body and an insertion portion connected to the connecting portion, wherein one end of the body is an assembling end;

a door frame mounted on the wall, wherein one side of the door frame facing away from wall includes an accommodation groove and an insertion groove that are connected with each other, the connecting portion is located in the accommodation groove, and the insertion portion is located in the insertion groove;

a fixing member inserted into the door frame and the door stop strip to fix the door stop strip to the door frame;

and the assembling end is connected to a buffer, and the buffer is pushed against a door panel.

As can be seen from the foregoing, the present invention mainly provides the door stop strip with the insertion portion and the connecting portion, one side of the door frame facing away from wall includes an accommodation groove and an insertion groove that are connected with each other, the connecting portion is located in the accommodation groove, the insertion portion is located in the insertion groove, the insertion groove and the accommodation groove are both in an elongated strip shape, so that the position of the insertion portion in the insertion groove can be fine-adjusted, then the position of the door stop strip relative to the door frame can be adjusted, so that the door stop can be shifted relative to the door frame and fine-tuned, and thus the door panel can be correctly pressed against the door stop.

DETAILED DESCRIPTION

Figure 1:
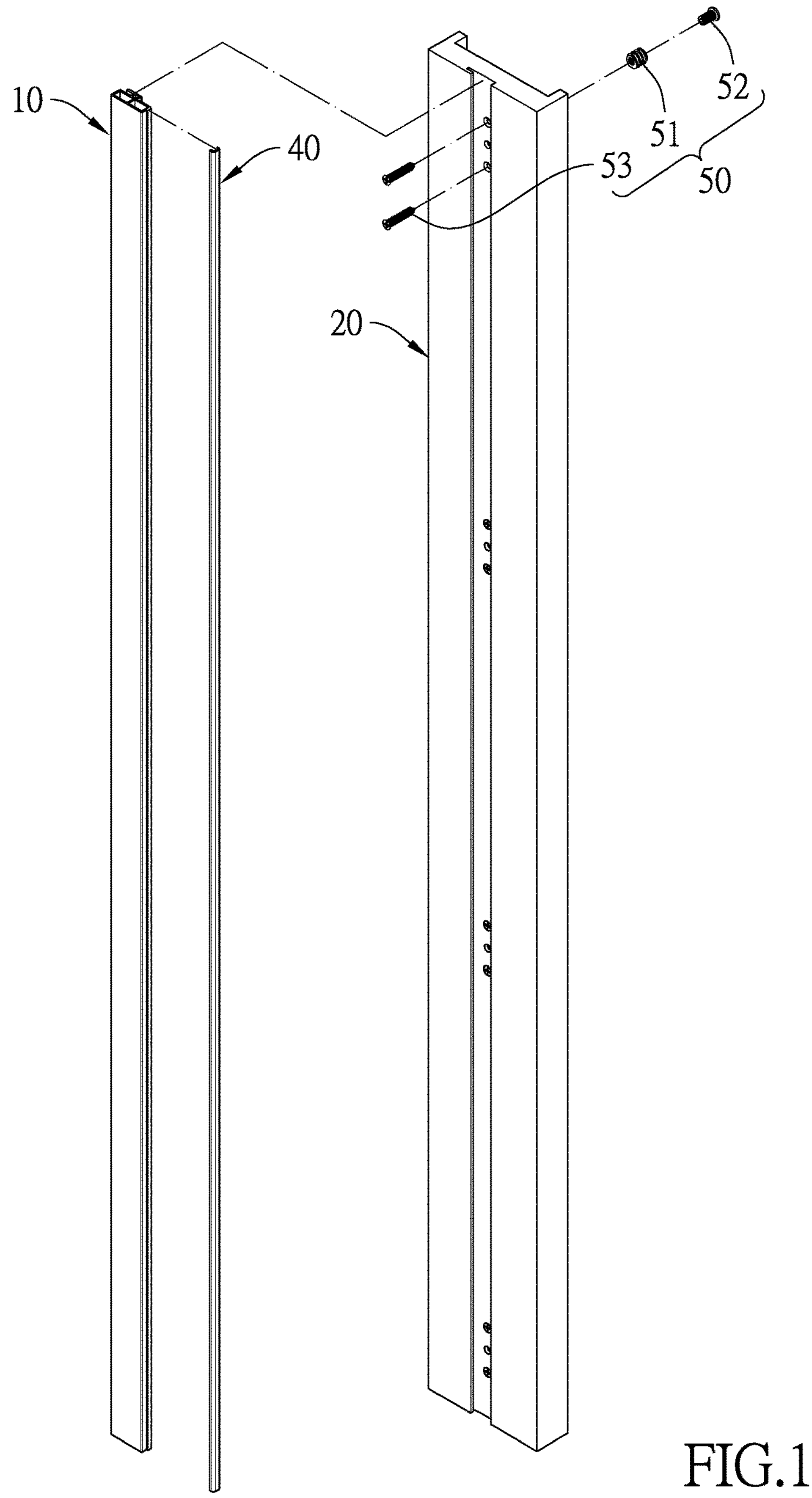
FIG. 1 is an exploded view of a door stop and door frame assembly in accordance with the present invention.
Figure 2:
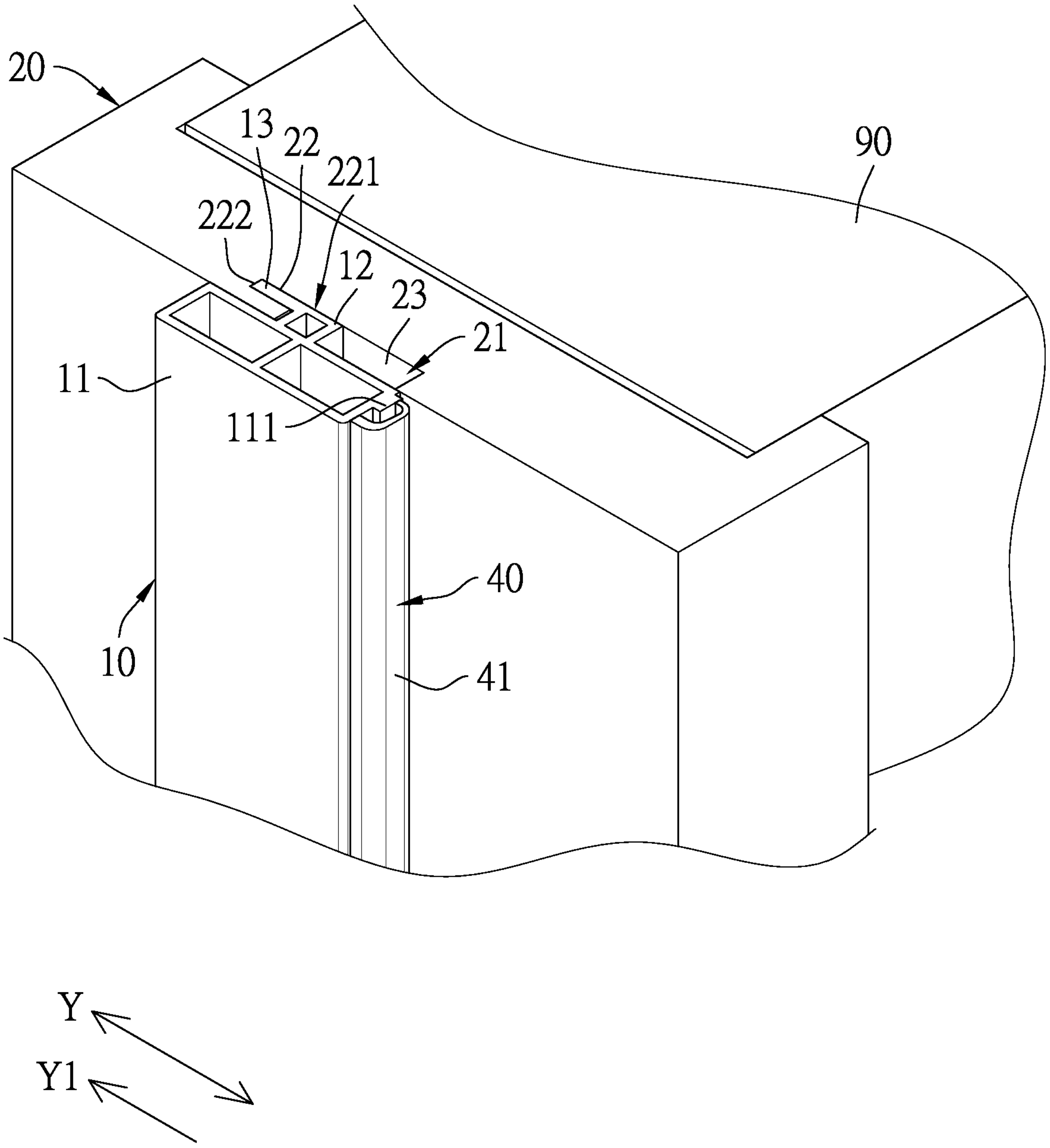
FIG. 2 is an illustrative view of the door stop and door frame assembly in accordance with the present invention.
Figure 3:
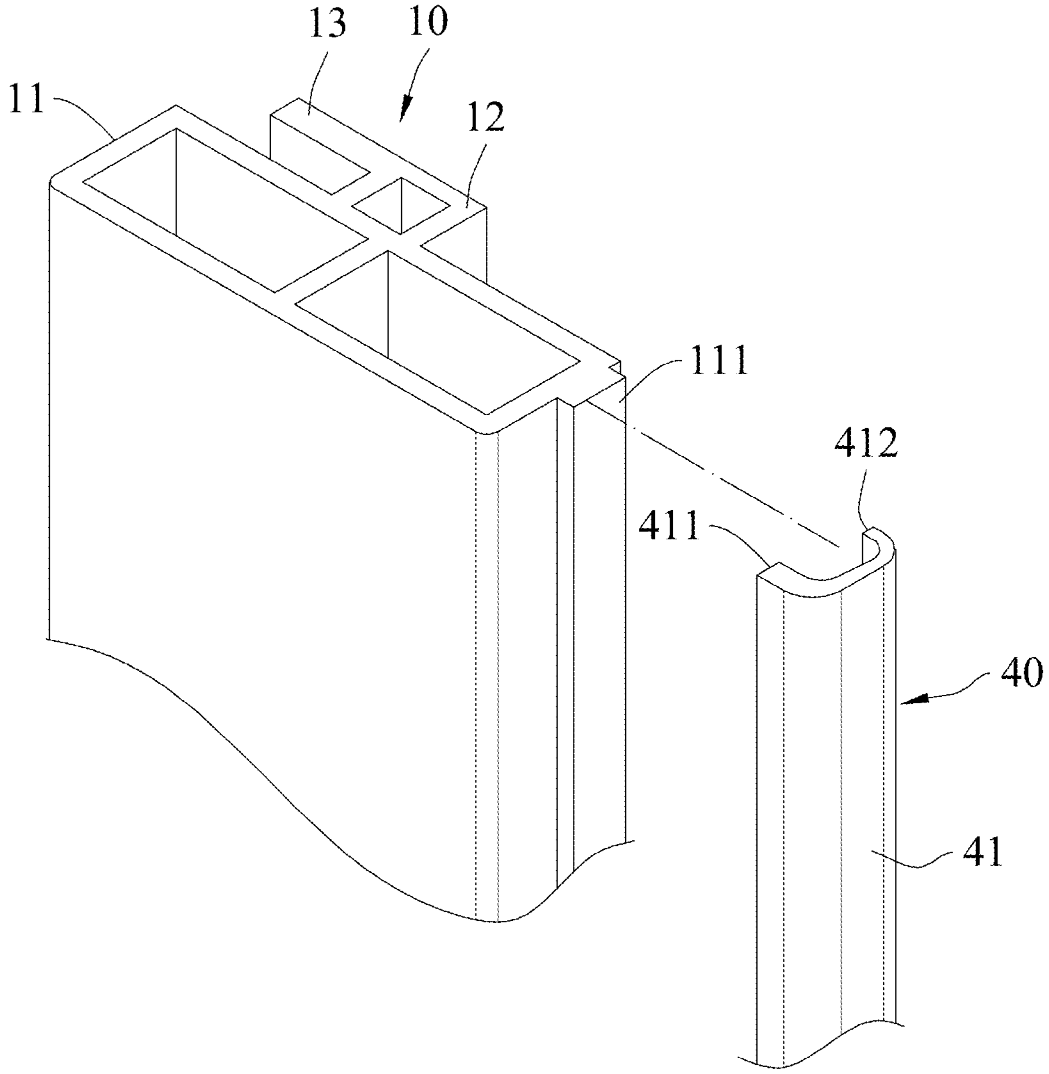
FIG. 3 is an exploded view of a door stop in accordance with the present invention.

The present invention provides a door stop and door frame assembly, as shown in FIG. 1-9, including:

A door stop strip 10 is an elongated strip, and includes a body 11 and a connecting portion 12 located on one side of the body 11 and an insertion portion 13 having one end connected to the connecting portion 12, the insertion portion 13 extends along a transverse direction Y and is in an elongated strip shape, and one end of the body 11 along the transverse direction Y is an assembling end 111;

A door frame 20 is mounted on a wall 90, and one side of the door frame 20 facing away from wall 90 includes an accommodation groove 21 and an insertion groove 22 that are connected along the transverse direction Y. The insertion groove 22 and the accommodation groove 21 extend along the transverse direction Y and are in an elongated strip shape. The connecting portion 12 is located in the accommodation groove 21, and the insertion portion 13 is located in the insertion groove 22;

Preferably, one end of the insertion groove 22 includes an opening 221, and the other end of the insertion groove 22 has a bottom 222. The opening 221 is connected to the accommodation groove 21, and the direction from the opening 221 to the bottom 222 is an impact direction Y1. It is worth mentioning that the transverse direction Y is bidirectional, and the impact direction Y1 is one of the transverse direction Y. One end of the insertion portion 13 that is not connected to the connecting portion 12 is rested against the bottom 222, thereby, when the door panel hits the door stop strip 10, it will make the door stop strip 10 more closely fit with the door frame 20.

A fixing member 30 is inserted into the door frame 20 and the door stop strip 10 to fix the door stop strip 10 to the door frame 20. In this embodiment, the fixing member 30 is inserted into the door frame 20 in a manner tilted from the assembling end 111, and the fixing member 30 is a mosquito nail;

In a preferred embodiment, the assembling end 111 is connected to a buffer 40, which is used to push against a door panel and provide buffering force for the door panel.

Figure 4:
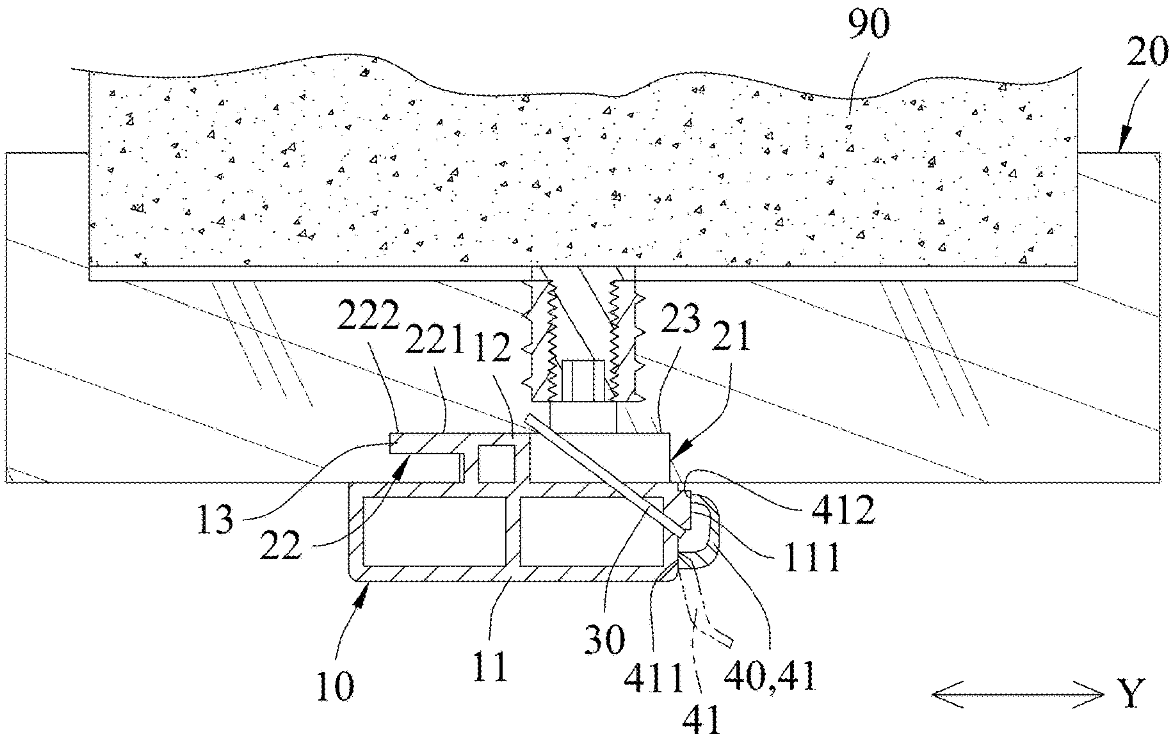
FIG. 4 is an assembly view of the door stop and door frame assembly in accordance with the present invention.
Figure 5:
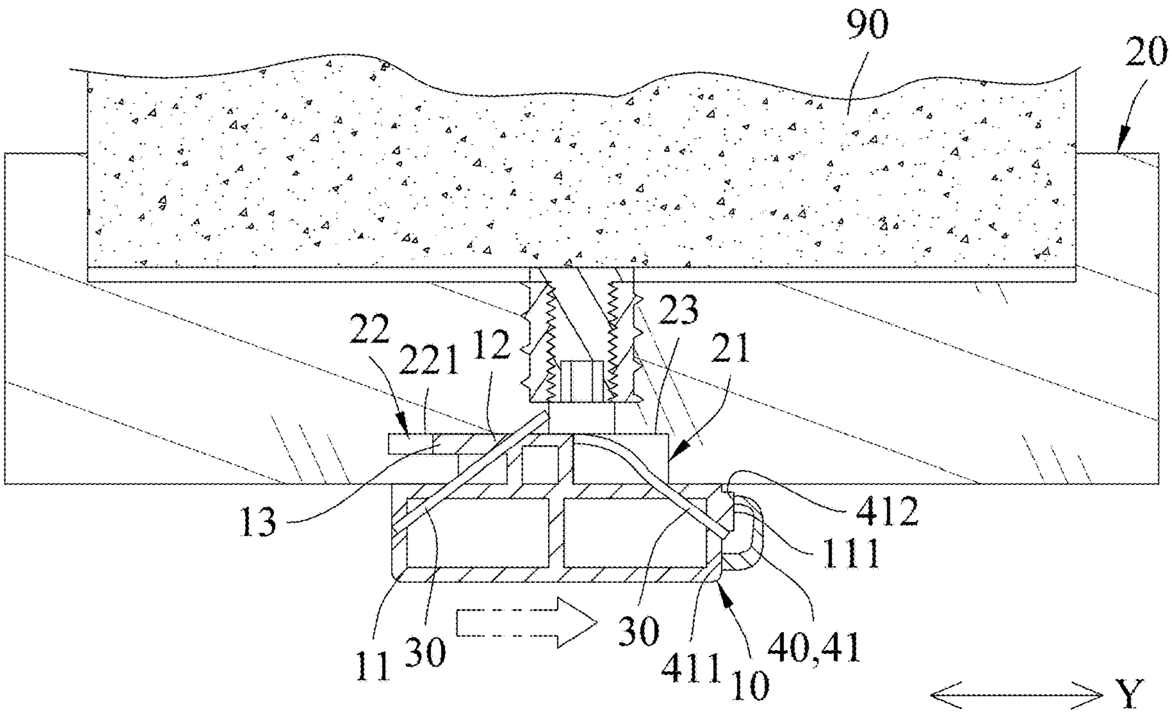
FIG. 5 is an illustrative view of the door stop and door frame assembly in accordance with the present invention.

In this embodiment, please refer to FIGS. 4 and 5, the buffer 40 is an arc-shaped member 41, which is made of flexible materials, such as but not limited to PVC material. The arc-shaped member 41 includes a first arc-shaped end 411 and a second arc-shaped end 412 which are opposite to each other. The first arc-shaped end 411 of the arc-shaped member 41 is fixedly connected to the assembling end 111, and the second arc-shaped end 412 of the arc-shaped member 41 is against the assembling end 111, which can be pulled by the user to lift the arc-shaped member 41. Furthermore, the arc-shaped member 41 can also cover the fixing member 30, so that the user cannot see it.

Figure 6:
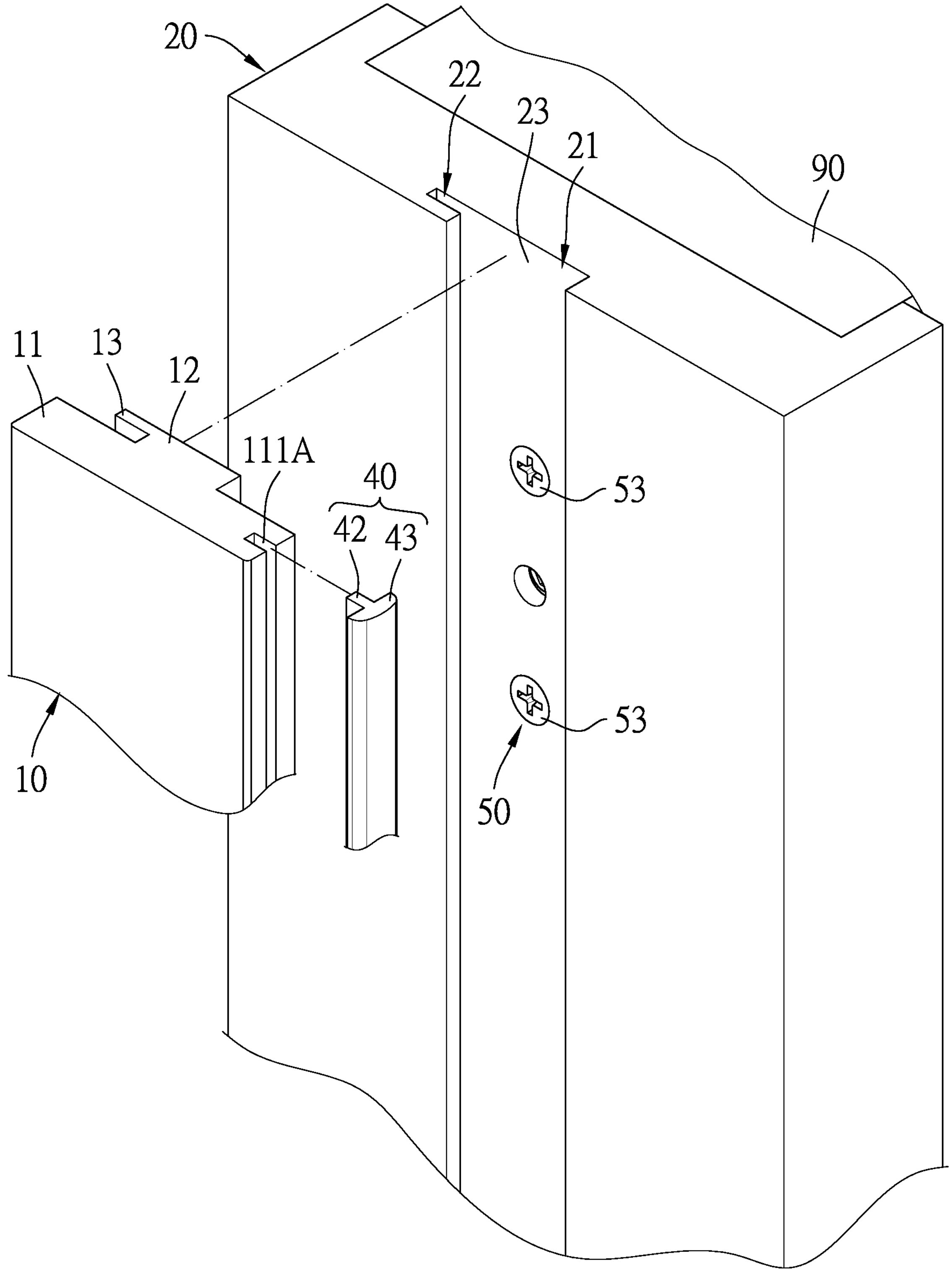
FIG. 6 is an exploded view of the door stop and door frame assembly in accordance with the present invention.
Figure 7:
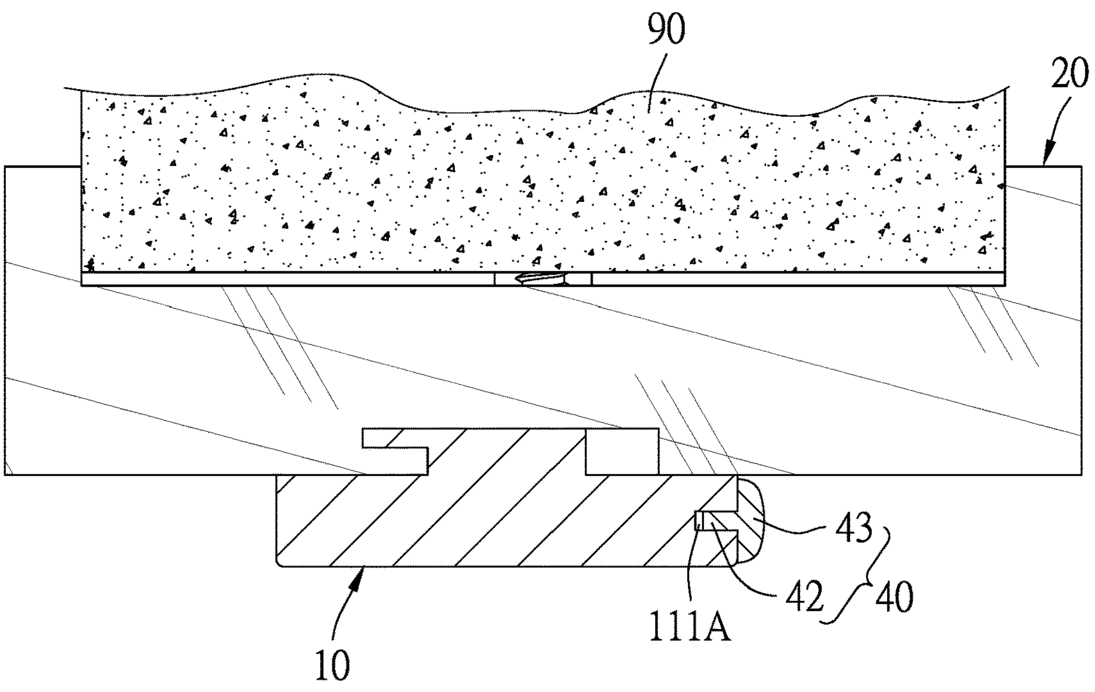
FIG. 7 is an illustrative view of the door stop and door frame assembly in accordance with the present invention.
Figure 8:
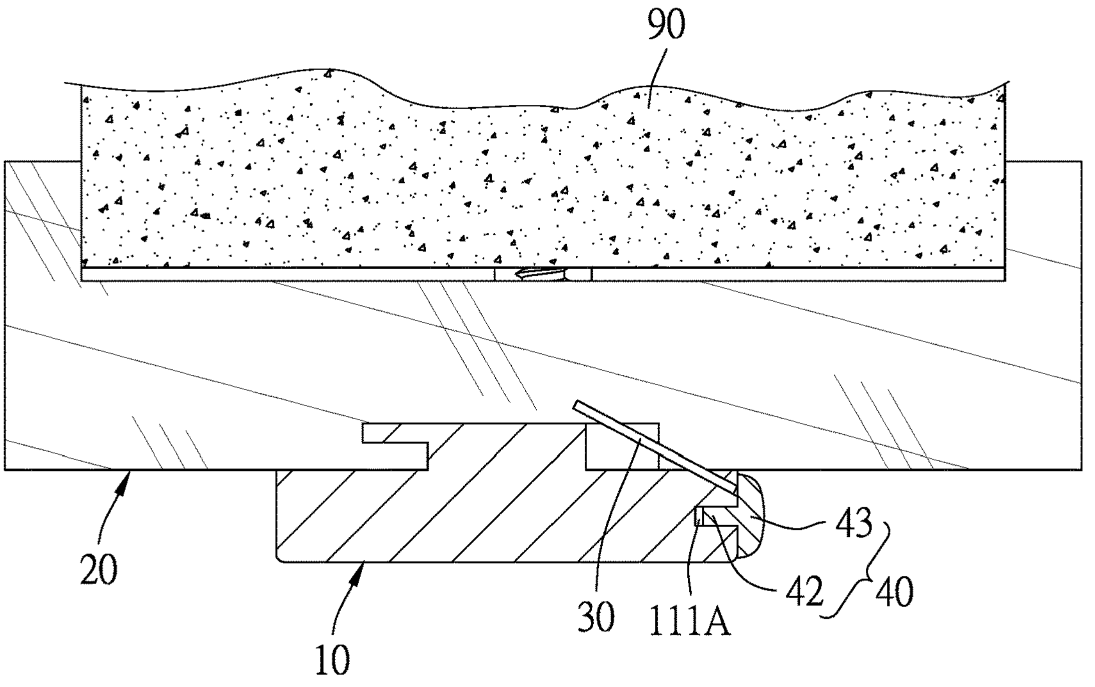
FIG. 8 is an illustrative view of the door stop and door frame assembly in accordance with the present invention.

In another embodiment, please refer to FIGS. 6-8, the assembling end 111 further includes a groove 111A, and the buffer 40 includes a fixing portion 42 and a buffering portion 43 that are connected with each other. The fixing portion 42 is inserted in the groove 111A to fix the buffering portion 43 to the assembling end 111, and the buffering portion 43 is abutted against the door panel.

Figure 9:
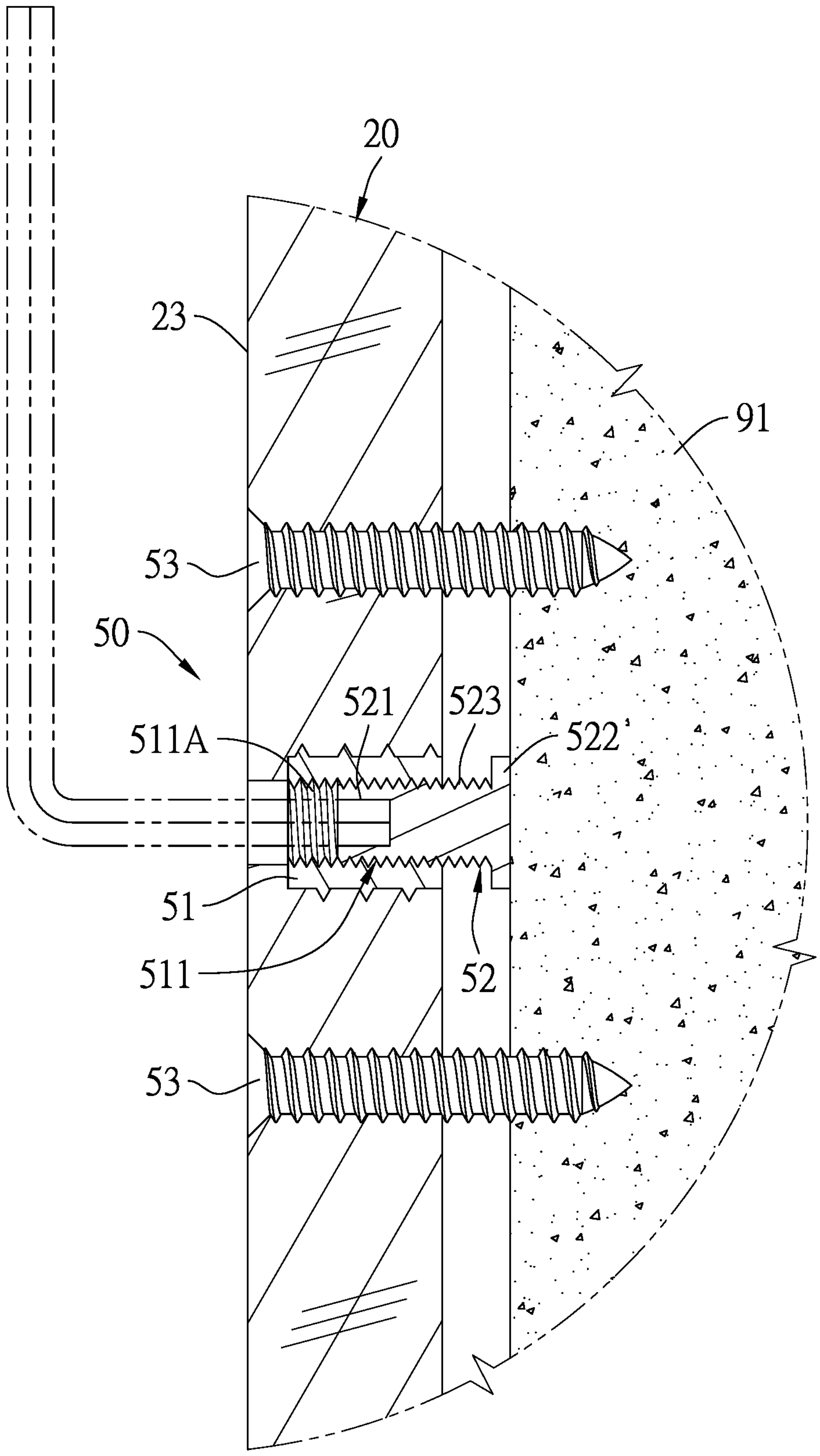
FIG. 9 is an illustrative view of the adjustment module in accordance with the present invention.

In other embodiments, please refer to FIGS. 1, 6, and 9, which also include an adjustment module 50, including an embedded member 51 and an adjustment member 52. The embedded member 51 is embedded in the door frame 20 and includes an inner threaded hole 511. The inner threaded hole 511 includes a plurality of inner threads 511A. The adjustment member 52 includes a wrench hole 521 at one end and a support portion 522 at the other. The adjustment member 52 further includes outer threads 523 on the peripheral wall thereof, and is disposed in the inner threaded hole 511 where the outer threads 523 are engaged with the inner threads 511A. The support portion 522 is used to lean against the wall 90 or away from the wall 90, and the wrench hole 521 allows the wrench to pass through to rotate the adjustment member 52, thereby driving the support portion 522 to lean against the wall 90 or away from the wall 90, so that the door frame 20 is pressed against or spaced at a distance from the wall 90, in order to achieve the effect of fine tuning the position of the door frame 20.

Preferably, the adjustment module 50 further includes a plurality of screws 53, which are inserted through the door frame 20 and threaded into the wall 90 to secure the door frame 20 to the wall 90.

Preferably, please refer to FIG. 6, the door frame 20 includes a locking surface 23, and the adjustment module 50 is exposed to the locking surface 23. The locking surface 23 is one of the inner walls of the accommodation groove 21, and the door stop strip 10 covers the locking surface 23 to prevent users from directly seeing the adjustment module 50, in order to enhance the overall aesthetics of the door stop and door frame assembly in this invention.

Figure 10:
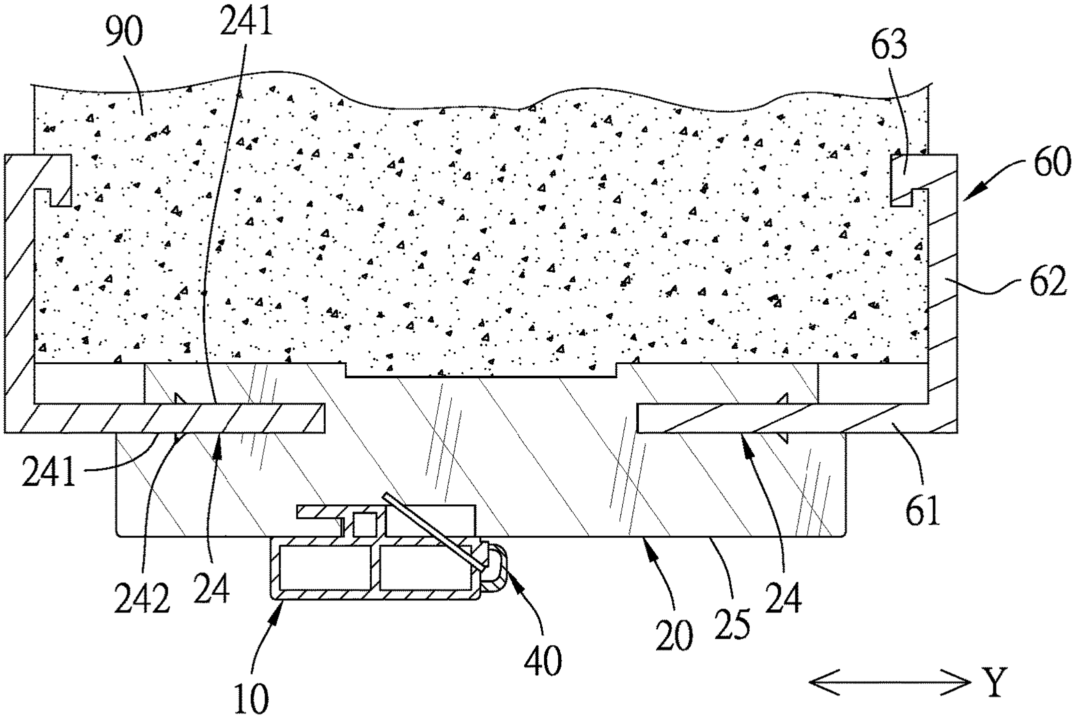
FIG. 10 is an illustrative view of the fasteners fixed to the door frame assembly in accordance with the present invention.

In other embodiments of this invention, please refer to FIG. 10:

The door frame 20 includes two elongated grooves 24 and two fasteners 60 which are respectively at two opposite ends thereof along the transverse direction Y (there are one elongated groove 24 and one fastener 60 at one end of the door frame 20, and one elongated groove 24 and one fastener 60 at the other). The fasteners 60 each include a first section 61, a second section 62, and a hook 63 which are connected in sequence. The extension directions of the first section 61 and the second section 62 are different. In this embodiment, the extension directions of the first section 61 and the second section 62 are perpendicular to each other. The first section 61 is inserted into the elongated groove 24 to fix the two fasteners 60 on the two opposite sides of the door frame 20, the extension direction of the second section 62 is the same as that of the wall 90, and the hook 63 is hooked to the wall 90 to fix the door frame 20 to the wall 90.

Figure 11:
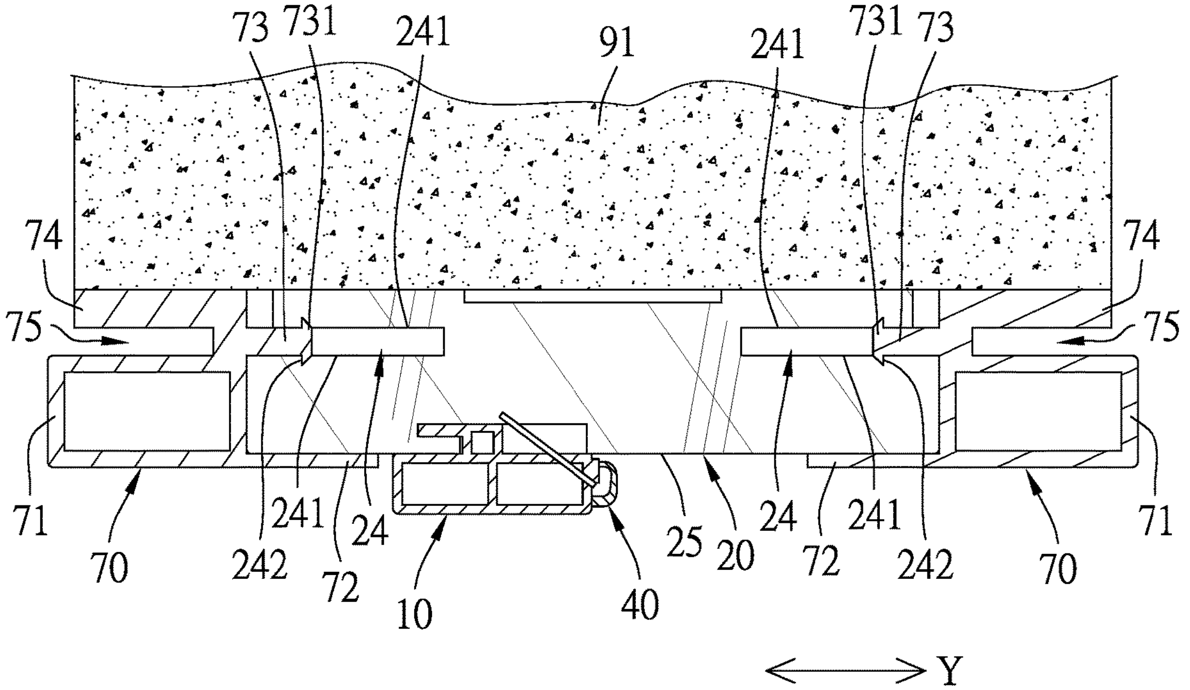
FIG. 11 is an illustrative view of the expansion members fixed to the door frame assembly in accordance with the present invention.

In another embodiment of this invention, please refer to FIG. 11:

the invention further includes two expansion members 70, each of which includes a main body 71 and a supporting section 72, a tenon section 73, and a side section 74 that extend from the main body 71. The supporting section 72 extends in the same direction as the tenon section 73, and the side section 74 extends in the opposite direction to the supporting section 72 and the tenon section 73. The supporting section 72 is abutted against an outer lateral surface 25 of the door frame 20. One end of the supporting section 72 that is not connected to the main body 71 is abutted against one end of the door stop strip 10 that is faced away from the assembling end 111. One end of the tenon section 73 that is not connected to the main body 71 includes a tenon convex portion 731. Two opposite outer surfaces 241 of the elongated groove 24 each include an engaging groove 242. The tenon section 73 extends into the elongated groove 24, and the tenon convex portions 731 are engaged in the engaging grooves 242, so that the expansion members 70 are locked to two opposite sides of the door frame 20. An expansion groove 75 is formed between the side section 74 and the main body 71, and the first section 61 of the fasteners 60 is inserted in the expansion groove 75, so that the expansion members 70 of this embodiment can be fixed to two opposite sides of the door frame 20, and can be adapted to walls 90 of different widths to effectively cover the end face of the wall 90.

What is claimed is:

1. A door stop and door frame assembly configured to be mounted on a wall, comprising:

a door stop strip in an elongated strip shape, and including a body and a connecting portion located on one side of the body and an insertion portion connected to the connecting portion, wherein one end of the body is an assembling end, and the insertion portion is in an elongated strip shape;

a door frame mounted on the wall, wherein one side of the door frame facing away from wall includes an accommodation groove and an insertion groove that are connected with each other, the insertion groove is in an elongated strip shape, the connecting portion is located in the accommodation groove, and the insertion portion is located in the insertion groove;

a fixing member inserted into the door frame and the door stop strip to fix the door stop strip to the door frame;

the assembling end is connected to a buffer, and the buffer is pushed against a door panel; and an adjustment module including an embedded member and an adjustment member, wherein the embedded member is embedded in the door frame and includes an inner threaded hole, the inner threaded hole includes a plurality of inner threads, the adjustment member includes a wrench hole at one end and a support portion at the other, the adjustment member includes outer threads and is disposed in the inner threaded hole where the outer threads are engaged with the inner threads.

2. The door stop and door frame assembly as claimed in claim 1, wherein the insertion portion extends along a transverse direction, one end of the body along the transverse direction is an assembling end, the accommodation groove and the insertion groove are connected along the transverse direction, and the accommodation groove is in an elongated strip shape.

3. The door stop and door frame assembly as claimed in claim 1, wherein the buffer is an arc-shaped member and made of flexible materials, the arc-shaped member includes a first arc-shaped end and a second arc-shaped end which are opposite to each other, the first arc-shaped end of the arc-shaped member is fixedly connected to the assembling end, and the second arc-shaped end of the arc-shaped member is against the assembling end, and the arc-shaped member covers the fixing member.

4. The door stop and door frame assembly as claimed in claim 1, wherein the assembling end further includes a groove, and the buffer includes a fixing portion and a buffering portion that are connected with each other, the fixing portion is inserted in the groove to fix the buffering portion to the assembling end, and the buffering portion is abutted against the door panel.

5. The door stop and door frame assembly as claimed in claim 1, wherein the adjustment module further includes a plurality of screws, which are inserted through the door frame.

6. The door stop and door frame assembly as claimed in claim 1, wherein the door frame includes a locking surface, the adjustment module is exposed to the locking surface, and the door stop strip covers the locking surface.

7. A door stop and door frame assembly configured to be mounted on a wall, comprising:

a door stop strip in an elongated strip shape, and including a body and a connecting portion located on one side of the body and an insertion portion connected to the connecting portion, wherein one end of the body is an assembling end, and the insertion portion is in an elongated strip shape;

a door frame mounted on the wall, wherein one side of the door frame facing away from wall includes an accommodation groove and an insertion groove that are connected with each other, the insertion groove is in an elongated strip shape, the connecting portion is located in the accommodation groove, and the insertion portion is located in the insertion groove; and a fixing member inserted into the door frame and the door stop strip to fix the door stop strip to the door frame;

wherein the assembling end is connected to a buffer, and the buffer is pushed against a door panel;

the insertion portion extends along a transverse direction, one end of the body along the transverse direction is an assembling end, the accommodation groove and the insertion groove are connected along the transverse direction, and the accommodation groove is in an elongated strip shape;

wherein the door frame includes two elongated grooves and two fasteners which are respectively at two opposite ends thereof along the transverse direction, the fasteners each include a first section, a second section, and a hook which are connected in sequence, extension directions of the first section and the second section are different, the first section is inserted into the elongated groove to fix the two fasteners on the two opposite sides of the door frame, and the hook is hooked to the wall.

8. A door stop and door frame assembly configured to be mounted on a wall, comprising:

a door stop strip in an elongated strip shape, and including a body and a connecting portion located on one side of the body and an insertion portion connected to the connecting portion, wherein one end of the body is an assembling end, and the insertion portion is in an elongated strip shape;

a door frame mounted on the wall, wherein one side of the door frame facing away from wall includes an accommodation groove and an insertion groove that are connected with each other, the insertion groove is in an elongated strip shape, the connecting portion is located in the accommodation groove, and the insertion portion is located in the insertion groove;

a fixing member inserted into the door frame and the door stop strip to fix the door stop strip to the door frame;

wherein the assembling end is connected to a buffer, and the buffer is pushed against a door panel;

the insertion portion extends along a transverse direction, one end of the body along the transverse direction is an assembling end, the accommodation groove and the insertion groove are connected along the transverse direction, and the accommodation groove is in an elongated strip shape;

two expansion members, each of which includes a main body and a supporting section, a tenon section, and a side section that extend from the main body, the supporting section extends in the same direction as the tenon section, the side section extends in a opposite direction to the supporting section and the tenon section, the supporting section is abutted against an outer lateral surface of the door frame, one end of the tenon section that is not connected to the main body includes a tenon convex portion, the door frame includes two elongated grooves which are respectively at two opposite ends thereof along the transverse direction, two opposite outer surfaces of the elongated groove each include an engaging groove, the tenon section extends into the elongated groove, the tenon convex portion is engaged in the engaging groove, so that the expansion members are locked to the two opposite sides of the door frame, an expansion groove is formed between the side section and the main body, and the first section of the fasteners is inserted in the expansion groove;

wherein the door frame includes two fasteners, the fasteners each include a first section, a second section, and a hook which are connected in sequence, extension directions of the first section and the second section are different, the first section is inserted into the elongated groove to fix the two fasteners on the two opposite sides of the door frame, and the hook is hooked to the wall.

* * * * *